Patented Nov. 24, 1936

2,061,560

UNITED STATES PATENT OFFICE 2,061,560

MANUFACTURE OF ALCOHOLIC BEVERAGES

Kenneth R. Brown, Tamaqua, Pa., assignor to Atlas Powder Company, Wilmington, Del., a corporation of Delaware No Drawing. Application April 24, 1934,
Serial No. 722,212

8 Claims. (Cl. 99—48)

This invention relates to the manufacture of alcoholic beverages, and more particularly to the blending of alcoholic beverages, and it has for its object to improve the palatability of such beverages. By alcoholic beverage I mean any beverage having an alcoholic content whether distilled, fortified, brewed, or a fermentation produce, such alcoholic beverages including whiskey, gin, brandy, rum, cordial, liqueur, beer and wine.

It has long been known that the palatability, and particularly the "smoothness" of alcoholic beverages, such as whiskies, brandies, cordials, liqueurs, and especially gins, can be improved by the addition of glycerine.

Now, I have found that polyhydric alcohols having more than three hydroxyl groups are more efficient than glycerine in imparting the desired smoothness to the alcoholic beverages. I have found that sorbitol, a hexahydric alcohol, is especially efficient for this purpose.

As illustrative of how the invention may be carried out, I give the following examples.

Example I 4 g. of sorbitol was added to one liter of rye whiskey, and the whole was agitated to effect complete solution. The resultant product was distinctly superior in palatability and smoothness to the original whiskey and to a similar sample of whiskey to which was added the same quantity of glycerine.

Example II 3 g. of sorbitol was added to one liter of gin. The mixture was agitated enough to effect complete solution. The resultant product was distinctly superior to the original gin in palatability and smoothness, and also to a like quantity of the original gin to which was added the same quantity of glycerine.

While I prefer to use sorbitol to improve the palatability of alcoholic beverages, I wish it to be understood that I do not limit myself to this particular polyhydric alcohol, but include any mixture of sorbitol with other suitable polyhydric alcohols.

Further, I find that it is not necessary to employ pure sorbitol. For example, a technical sorbitol, which is produced by the reduction of glucose and which contains, in addition to sorbitol, moisture, other polyhydric alcohols, small amounts of ash, sugar, organic acids, and other impurities, is found to give highly desirable results in improving the palatability and smoothness of alcoholic beverages when used in the manner indicated.

Among the polyhydric alcohols having more than three hydroxyl groups that I contemplate mixing with sorbital in the practice of my invention are mannitol, iditol and dulcitol, or any mixtures of these with each other, or any mixtures of these with any other desired substances used as modifiers or diluents, or otherwise, in the finished product.

Further, the invention contemplates the use of polyhydric alcohols of the character indicated, in the treatment of wines and even beer for the improvement of the flavor and palatability thereof, and where a wine is treated having sorbitol, or its equivalent, as a part of the natural content of the wine, I contemplate the addition of sorbitol in a quantity beyond the normal content of the wine, for the purpose set forth.

Further, I contemplate the employment of mixtures of any of the polyhydric alcohols named, with glycerine, to improve the palatability of alcoholic beverages. I look upon mixtures of glycerine and sorbitol or glycerine and mannitol as being especially suitable in this relation.

Having described my invention, what I claim is:

1. The described method which consists of adding to an alcoholic beverage, sorbitol.

2. The method described which consists of adding to an alcoholic beverage, which contains sorbitol as a natural ingredient thereof, an additional quantity of sorbitol.

3. The herein described composition of matter consisting of an alcoholic beverage having sorbitol as a natural constituent thereof, and an added quantity of sorbitol beyond the natural content of said beverage.

4. The herein described composition of matter comprising an alcoholic beverage and an added quantity of sorbitol.

5. The herein described method which consists of adding to an alcoholic beverage, a mixture of glycerine and sorbitol.

6. The herein described composition of matter consisting of an alcoholic beverage and an added quantity of a mixture of glycerine and sorbitol.

7. The described method which consists of adding to an alcoholic beverage, sorbitol in an amount substantially less than that required to make a saturated solution.

8. An alcoholic beverage having sorbitol added thereto in an amount substantially less than that required to make a saturated solution.

KENNETH R. BROWN.